(12) United States Patent
Braeuchle et al.

(10) Patent No.: US 11,342,794 B2
(45) Date of Patent: May 24, 2022

(54) INDUCTIVE CHARGING DEVICE AND METHOD FOR MONITORING AN INDUCTIVE CHARGING DEVICE

(71) Applicant: Robert Bosch GmbH, Stuttgart (DE)

(72) Inventors: Moritz Braeuchle, Walddorfhaeslach (DE); Gabriel Krein, Neckarzimmern (DE); Philipp Schumann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/967,491

(22) PCT Filed: Jan. 30, 2019

(86) PCT No.: PCT/EP2019/052208
§ 371 (c)(1),
(2) Date: Aug. 5, 2020

(87) PCT Pub. No.: WO2019/154684
PCT Pub. Date: Aug. 15, 2019

(65) Prior Publication Data
US 2021/0257857 A1    Aug. 19, 2021

(30) Foreign Application Priority Data

Feb. 6, 2018 (DE) .................... 10 2018 201 824.3

(51) Int. Cl.
*H02J 50/12* (2016.01)
*H02J 50/60* (2016.01)
(Continued)

(52) U.S. Cl.
CPC ............ *H02J 50/12* (2016.02); *B60L 53/124* (2019.02); *B60L 53/38* (2019.02); *H02J 50/60* (2016.02)

(58) Field of Classification Search
CPC .. H02J 50/12; H02J 50/60; H02J 50/70; H02J 50/80; H02J 50/90; H02J 7/025;
(Continued)

(56) References Cited

U.S. PATENT DOCUMENTS

2018/0083349 A1* 3/2018 Sieber .................... B60L 53/39

FOREIGN PATENT DOCUMENTS

DE    102011010049    11/2011
DE    102013227129    6/2015
(Continued)

OTHER PUBLICATIONS

International Search Report for Application No. PCT/EP2019/052208 dated May 6, 2019 (English Translation, 2 pages).

*Primary Examiner* — Lincoln D Donovan
*Assistant Examiner* — Alex W Lam
(74) *Attorney, Agent, or Firm* — Michael Best & Friedrich LLP

(57) ABSTRACT

The invention relates to an inductive charging device for a vehicle and to a method for monitoring an inductive charging device for a vehicle, wherein a metal object is detected in each case. The method has the steps of: carrying out a passive metal object detection, MOD, while a battery of a vehicle (1) is inductively charged by generating an electromagnetic field in order to induce a charge current (I2) in a receiving coil structure (2) of the vehicle (1); and carrying out an active MOD at points in time at which no inductive charging process is being carried out.

7 Claims, 2 Drawing Sheets

(51) Int. Cl.
*B60L 53/124* (2019.01)
*B60L 53/38* (2019.01)

(58) Field of Classification Search
CPC ...... H02J 7/0027; H02J 2310/48; H02J 50/10;
B60L 53/38; B60L 53/124; B60L 53/10;
B60L 53/12; B60L 53/122; B60L 53/126;
B60L 53/60; B60L 53/62; B60L 53/31;
B60L 53/39; H01F 27/28; Y02T 90/12;
Y02T 10/7072; Y02T 10/70
See application file for complete search history.

(56) References Cited

FOREIGN PATENT DOCUMENTS

| | | |
|---|---|---|
| DE | 202016100924 | 5/2017 |
| DE | 102015224013 | 6/2017 |
| WO | 2013127445 | 9/2013 |
| WO | 2018091192 | 5/2018 |

* cited by examiner

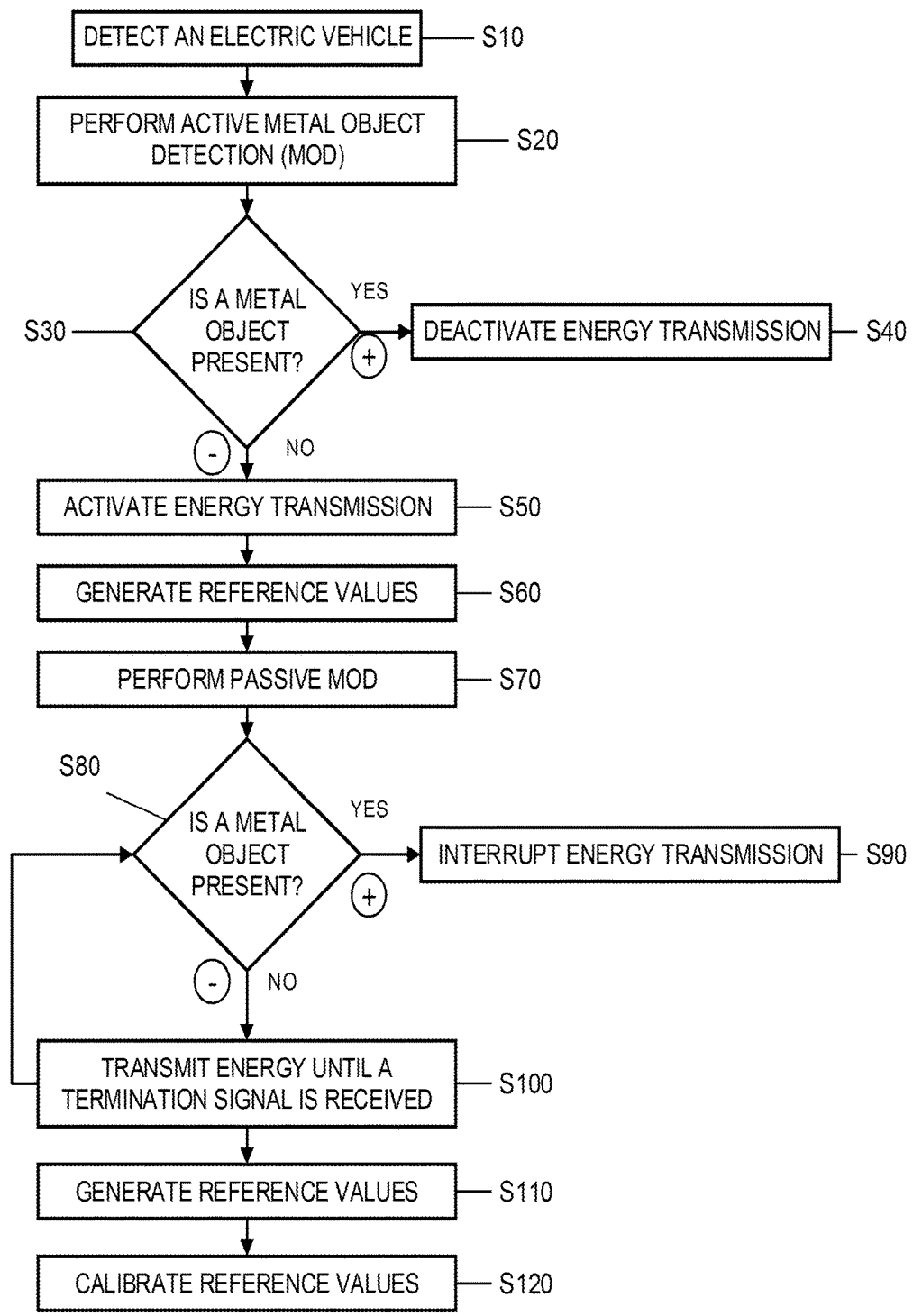

INDUCTIVE CHARGING DEVICE AND METHOD FOR MONITORING AN INDUCTIVE CHARGING DEVICE

BACKGROUND

The present invention relates to an inductive charging device for a vehicle and a method for monitoring an inductive charging device for a vehicle, wherein in each case a metal object detection procedure is performed.

Electric vehicles and hybrid vehicles usually comprise an electrical energy storage device, by way of example a traction battery, which provides electrical energy for a drive of the vehicle. If this electrical energy storage device discharges completely or in part, then the electric vehicle must drive to a charging station where the energy storage device may be re-charged. It may also be advantageous in the case of hybrid vehicles to re-charge the electrical energy storage device by means of electrical current rather than by combusting a fossil fuel. If an electric vehicle is mentioned below, this is always also to be understood to include a hybrid vehicle.

Hitherto it has been usual that at charging stations for electric vehicles an electric vehicle is connected to the charging station by means of a cable connection. This connection must be produced in a manual mechanical manner by a user. In this case, it is inter alia necessary that the charging station and the electric vehicle comprise a mutually corresponding connecting system, in other words that plugs and sockets at the charging station and electric vehicle may be plugged into one another.

In addition, cableless charging systems for electric vehicles are also known in part. In such cases, an electric vehicle may be parked over a transmitter coil that is also known as a primary coil. The area in which the electric vehicle must be driven for this purpose is also described as a charging path, inductive charging station or charging device and the like. The primary coil is supplied with an alternating current and subsequently transmits a high frequency magnetic alternating field. This magnetic alternating field generates a corresponding alternating current in a receiver coil, which is also referred to as a secondary coil, within the electric vehicle. It is consequently possible by means of the induced electrical current to charge the electrical energy storage device, by way of example the traction battery, of the electric vehicle. Such a system for inductively charging a vehicle battery is described by way of example in DE 10 2011 010 049 A1.

If an electrical energy storage device, by way of example a battery, of an electric vehicle, is charged in a cableless manner, the transmitter coil is typically either embedded in a road surface or in a surface of a parking lot or is configured as a charging plate or charging path that is placed on the ground and is connected to a power supply system by means of a suitable electronic system. The power supply system may be a decentralized power supply system or the public power supply system.

The receiver coil, or secondary coil, is typically fixedly mounted in the subfloor of the electric vehicle and for its part connected by means of a suitable electronic system to the electrical energy storage device. So as to transmit energy, the transmitter coil or primary coil generates a high frequency alternating field that passes through the receiver coil or secondary coil where it induces a corresponding current. Since on the one hand the transmitted power output is scaled in a linear manner with the switching frequency, on the other hand the switching frequency is limited by virtue of the electronic control system and losses in the transmission path, a typical frequency range of 30 to 150 kHz is produced.

An air gap is always located between the transmitter coil of the charging device and the receiver coil in the electric vehicle. On account of the ground clearance required by electric vehicles, this air gap typically amounts to a few centimeters, air gaps in the magnitude of 3 to 30 cm are in this case quite widespread if an ideal particularly small air gap is not realized by virtue of measures such as lowering the receiver coil that is fixed to the vehicle, lowering the entire electric vehicle and/or raising the transmitter coil that is fixed to the ground.

The magnetic fields that occur in the air gap during the transmission procedure are suitable for inducing electrical eddy currents in any metal or electrical conductive objects that are located in the air gap. Ohmic losses cause these so-called foreign objects to heat up. The heating-up of foreign objects is undesirable since it leads in particular to unnecessary losses during the energy transmission procedure. For this reason, it is desirable during the procedure of inductively charging an electric vehicle to limit the extent to which such foreign objects heat up either by limiting the magnetic field or using suitable means to detect any objects located in the air gap and subsequently to deactivate the energy transmission procedure until these objects are removed or at least until their influence reduces to below a predetermined threshold.

Methods known in the prior art for metal object detection (MOD), wherein the term "metal objects" is to include any foreign objects in which magnetic alternating fields induce electrical eddy currents, are based on conventional metal detectors. The core element of such metal detectors is usually a number of sensor coils, by way of example an array, in other words an ordered array, of sensor coils. In this case, there are essentially two different methods that may be described on the one hand as active methods and on the other hand as passive methods.

In the case of active methods, the sensor coil array is excited, in other words is energized at least in part by an alternating current. Subsequently, measurements are detected and evaluated regarding changes in the received signal (by way of example in one of the coils of the sensor coil array) and/or a change in the electrical characteristics of the sensor coil array in the presence of a metal object.

However, when charging electric vehicles in a wireless manner, it is difficult during the energy transmission procedure to use conventional metal detection methods since the transmitter coil generates a strong magnetic main field which greatly hampers the active MOD procedure. For this reason, active MOD methods are usually either performed during a short period when the energy transmission procedure, in other words the main field, is switched off, or it is necessary to use complicated sensor coil designs.

In other words, previous methods for MOD, which function by actively exciting the sensor coil array and evaluate electrical characteristics of the sensor coils, by way of example impedance, quality, series resistance, inductivity and the like, generally only operate while the energy transmission procedure is interrupted because they are hampered by the strong magnetic field of the primary coil. The frequent switching on and off of the alternating magnetic field of the primary coil is associated with additional losses and an extended charging time, both of which are undesired.

An alternative method is described by way of example in DE 10 2015 224 013 A1 which describes a passive method for MOD. This method does not actively excite the sensor coil array but rather passively observes the magnetic field during the energy transmission from the primary coil to the secondary coil in that induced electrical currents or voltages in the sensor coils of the sensor coil array are observed and evaluated.

MOD procedures that use such passive methods usually require characteristic fields to be recorded and stored. These characteristic fields may be very complex since inter alia the three dimensional offset situation of the two energy transmitting coils (primary coil and secondary coil) and the current in the primary coil and the secondary coil must be taken into consideration and this already causes a complex 5-dimensional problem. In addition, such passive MOD methods are only possible during the energy transmission procedure. If the energy transmission procedure is switched off, it is not possible to perform a passive MOD procedure since the main magnetic field of the energy transmission procedure is required for monitoring purposes.

SUMMARY

Accordingly, an inductive charging device for a vehicle is provided, having:
a transmitter coil structure for inductively charging a battery of a vehicle by means of generating an electromagnetic field so as to induce a charging current in a receiver coil structure of the vehicle;
a current supply facility for energizing the transmitter coil structure;
a sensor coil structure having a number of sensor coils;
a control facility that is configured so as to set the inductive charging device into a passive detection mode while an inductive charging procedure takes place and to set the inductive charging device into an active detection mode if an inductive charging procedure is not actually being performed;
a passive electronic evaluation system, which is configured so as in the passive detection mode to evaluate a current that is induced in the sensor coil structure and to use it for a passive metal object detection, MOD, in the area of the transmitter coil structure;
and an active electronic sensor system, which is configured so as in the active detection mode to generate a magnetic sensor field for an active MOD procedure in the area of the transmitter coil structure by means of at least in part energizing the sensor coil structure.

The primary coil, or the transmitter coil, on the one hand and the secondary coil, or the receiver coil, on the other hand are also described above and below jointly as energy transmission coils. The term 'energy transmission procedure' is to be understood in particular as the generation of a magnetic alternating field by means of the transmitter coil or primary coil so as to induce a charging current in the secondary coil.

Furthermore, a method for monitoring an inductive charging device for a vehicle is provided, having the steps:
performing a passive metal object detection procedure (MOD) while a battery of a vehicle is being inductively charged by means of generating an electromagnetic field so as to induce a charging current in a receiver coil structure of the vehicle;
and
performing an active MOD procedure at points in time at which inductive charging is not taking place.

A fundamental idea of the present invention is to use known methods for MOD in combination. In this manner, the weak points of the two methods may be circumvented or compensated. Thus, an MOD procedure may be ensured both in the case of a switched-off (deactivated) and also switched-on (activated) energy transmission procedure. The charging station is thus reliably protected and not susceptible with regard to foreign objects in the environment.

Advantageously, a foreign object may also be detected prior to the energy transmission procedure being switched on, namely by means of the active MOD method. This is particularly advantageous since during the energy transmission procedure large magnetic field strengths may occur between the energy transmitting coils and thus even very short time periods of energy transmission may lead to an intense heating up of foreign objects, in particular metal objects.

In addition, it is not necessary to determine a characteristic field in the dimensions x, y and z (three-dimensional offset situation of the two energy transmitting coils) prior to positioning over the inductive charging device, which considerably simplifies the procedure of evaluating the passive MOD method and may reduce the complexity of the characteristic fields by the three unknown variables x, y and z. Thus, there only remains the dependency upon the energy transmitting coil currents I1 and I2 of the energy transmitting coils, said currents already generally being measured so as to closed-loop control the energy transmission procedure. Thus, the additional outlay for providing the charging device in accordance with the invention or the method is comparatively low.

It is possible in accordance with the invention to optionally completely omit the procedure of determining the characteristic fields since the charging device may be calibrated at the start of an operation to the state which is free of foreign objects. During a transition from one MOD method to another MOD method, in other words during the transition from the passive MOD method to the active MOD method or conversely, in each case as the energy transmission procedure is switched on or switched off, it is concluded that a foreign object was not present in the previous time period and subsequently advantageously the respective method that is about to start is calibrated to the prevailing state which is free of foreign objects. It is possible in this manner to minimize environmental conditions, ageing effects and environmental influences, as a result of which it is possible to evaluate the metal object detection procedure MOD in a particularly precise manner.

It is also particularly advantageous that the number of sensor coils is used both by the active MOD method and also by the passive MOD method with the result that the outlay with regard to additional hardware is particularly low.

In accordance with a preferred development, the control facility is configured so as to use a result of the MOD procedure in the passive detection mode for calibrating or adjusting the active electric sensor system. Thus, it is always possible to perform a particularly precise active MOD procedure.

In accordance with a further preferred development, the control facility is configured so as to use a result of the MOD procedure in the active detection mode for calibrating or adjusting the passive electronic evaluation system. Thus, it is always possible to perform a particularly precise passive MOD procedure.

In accordance with a further preference development, the active electronic sensor system is configured so as to detect at least one electrical characteristic at least of one sensor coil of the sensor coil structure and to perform the MOD procedure whilst using the at least one detected electrical characteristic.

In accordance with a further preferred development, the active electronic sensor system is configured so as to detect at least one electrical characteristic at least of one sensor coil of the sensor coil structure, said one sensor coil being energized so as to generate the magnetic sensor field, and to perform the MOD procedure whilst using the at least one detected electrical characteristic.

In accordance with a further preferred development, the active electronic sensor system is configured so as to detect at least one electrical characteristic at least of one sensor coil of the sensor coil structure, said one sensor coil not being energized during the procedure of generating the magnetic sensor field, and to perform the MOD procedure whilst using the at least one detected electrical characteristic.

In accordance with a further preferred development, the method in accordance with the invention includes adjusting or calibrating the active MOD procedure whilst using results of the passive MOD procedure.

In accordance with a further preferred development, the method in accordance with the invention includes adjusting or calibrating the passive MOD procedure whilst using results of the active MOD procedure.

BRIEF DESCRIPTION OF THE DRAWINGS

The present invention is further explained below with reference to the exemplary embodiments illustrated in the schematic figures of the drawings. In the drawings:

FIG. 2 illustrates a schematic flow diagram for explaining a method in accordance with a further embodiment of the present invention.

Figure 1:
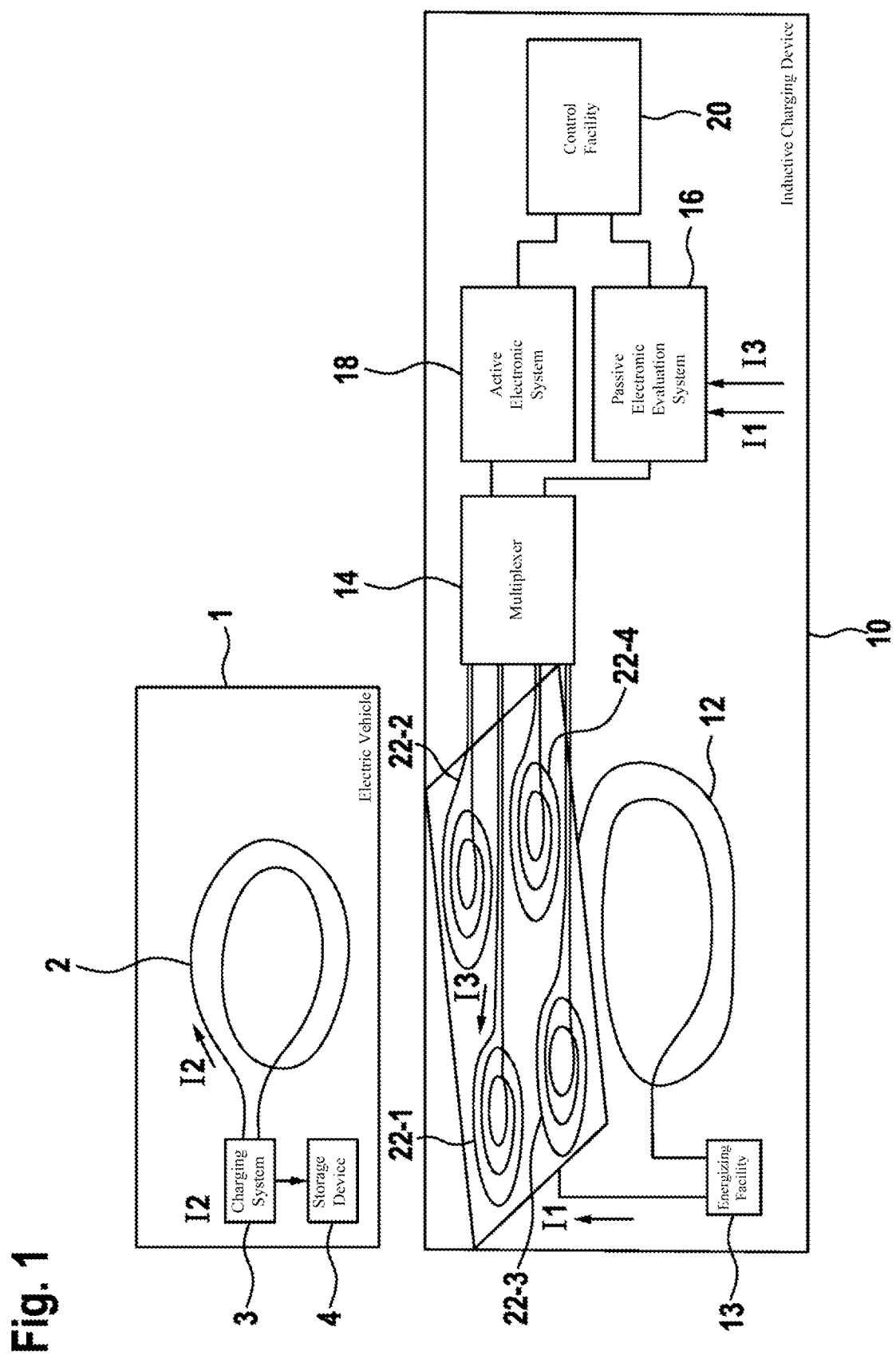
FIG. 1 illustrates schematically an electric vehicle and an inductive charging device in accordance with one embodiment of the present invention.

In all the figures, like or like-functioning elements and devices—unless otherwise indicated—are provided with the same reference numerals. The numbering of the method steps is merely for clarity of overview and in particular—unless otherwise indicated—does not imply a specific time sequence. In particular several method steps may also be performed simultaneously.

DETAILED DESCRIPTION

FIG. 1 illustrates schematically an electric vehicle 1, which comprises a charging coil 2 that may also be described as a secondary coil. Furthermore, the vehicle 1 comprises an electronic charging system 3 that is configured and arranged so as to use a charging current I2 that is induced in the secondary coil 2 so as to charge an electrical energy storage deice 4, by way of example a battery of the electric vehicle 1.

In addition, FIG. 1 illustrates an inductive charging device 10 in accordance with one embodiment of the present invention. The inductive charging device 10 comprises a transmitter coil 12, which may be energized by means of an energizing facility 13 with an electrical transmitter current I1 that is in particular a high frequency alternating current. The transmitter coil 12 is preferably embedded in a road surface or in a surface of a parking lot or is arranged in a charging plate or a charging path that is placed or may be placed on a road surface or on a surface of a parking lot.

A sensor coil structure, in other words a number of sensor coils 22-1, 22-2, 22-3, 22-4, is arranged between the position of the transmitter coil 12 and the desired position of the receiver coil 2 for the energy transmission procedure, said number of sensor coils also being referred to below collectively as 22-i. A number of sensor coils 22-i that may be divided by four has proven to be advantageous for a spatial division of the MOD procedure with the result that it is preferred that a number of sensor coils 22-i is provided which represents a whole number multiple of four. However, it goes without saying that other numbers of sensor coils 22-i may also be used, by way of example even numbers of sensor coils 22-i such as two or six sensor coils 22-i or also any other numbers of sensor coils 22-i, in particular even only a single sensor coil 22-i.

As FIG. 1 further illustrates, the sensor coil structure, in other words the number of sensor coils 22-i is advantageously connected to a multiplexer 14 that is configured and embodied so as to chronologically multiplex received signals (in other words in particular in the electrical currents I3 that are induced in the sensor coils 22-i) of the sensor coils 22-i, and by way of example to provide said received signals in a single sensor coils-sensor signal for evaluation. In lieu of a multiplexer 14, it is also possible to use a multiplicity of individual lines, which each transmit a single sensor coils-sensor signal of a single sensor coil for evaluation.

Furthermore, individual sub-groups of sensor coils 22-i may also each comprise a dedicated multiplexer with the result that it is possible to provide a total of two or more sensor coils-sensor signals by means of the multiplexer, however it is possible for example to provide fewer sensor coils-sensor signals than if each sensor coil 22-i were to transmit a dedicated sensor coils-sensor signal.

The embodiment illustrated in FIG. 1 is described in detail below with reference to the example that has a single multiplexer 14, wherein the embodiment may be readily adapted in accordance with the above described variants.

The sensor coils-sensor signal may be in particular a respective electrical alternating current I3 that is induced in a sensor coil 22-i or a signal that is based thereon. The sensor coils-sensor signal (or in the above described variants, the multiple sensor coils-sensor signals) are also used for the passive MOD method since it is possible for the presence of a foreign object in an air gap between to the transmitter coil 12 and the receiver coil 2 to cause the induced electrical alternating current I3 to change in such a manner that it may be evaluated.

In particular, it is possible with reference to the sensor coils-sensor signals to determine and evaluate at least one electrical characteristic at least of one sensor coil 22-i, in particular the respective electrical characteristic of all sensor coils 22-i. The at least one electrical characteristic may be at least one of the following electrical variables: impedance, quality, series resistance, inductivity.

A passive electronic evaluation system 16 of the inductive charging device 10 is configured and embodied so as to receive the sensor coils-sensor signal that is provided by the multiplexer 14 (or according to one of the above described variants directly by the sensor coils 22-i) and based thereon to perform a passive MOD procedure, in particular as described in detail below with reference to FIG. 2.

The passive electronic evaluation system 16 may comprise for this purpose signal inputs, at which the passive electronic evaluation system 16 may receive further parameters (or signals that indicate such parameters), by way of example a signal that indicates the charging current I2, a signal that indicates the transmission current I1 and/or the like. The signal that indicates the charging current I2 may be transmitted by way of example by a wireless communication device of the electric vehicle 1 to a wireless communication device of the charging device 10.

The passive electronic evaluation system 16 is configured and embodied so as to perform the passive MOD method according to a type and manner known in the prior art, by way of example as further explained below with reference to FIG. 2.

Furthermore, the inductive charging device 10 comprises an active electronic sensor system 18 for performing an active MOD method, by way of example as further explained below with regard to FIG. 2. Furthermore, the inductive charging device 10 comprises a control facility 20 by means of which the passive electronic evaluation system 16 and the active electronic sensor system 18 may be controlled at least to the extent that the active MOD method is performed always then and only then when energy is actually not being transmitted by the transmitter coil 12 to the receiver coil 2 (energy transmission deactivated) and that the passive MOD method is performed always then and only then when energy is actually being transmitted between the transmitter coil 12 and the receiver coil 2 (energy transmission activated).

The control facility 20 may comprise further functions. By way of example, the control facility 20 may be configured and embodied so as to perform an optional calibration of the passive electronic evaluation system 16 and/or of the active electronic sensor system 18, as is further described below with regard to FIG. 2.

In particular, the control facility 20 may be configured and embodied so as to use an output signal of the passive electronic evaluation system 16 in order to provide reference values for the active MOD method for the active electronic sensor system 18 and/or to evaluate an output signal of the active electronic sensor system 18 in order to provide reference values for the passive MOD method for the passive electronic evaluation system 16.

In other words, it is advantageously possible to adjust or calibrate the active electronic sensor system 18 whilst using results or output signals of the passive electronic evaluation system 16, and/or the passive electronic evaluation system 16 may be adjusted or calibrated whilst using results or output signals of the active electronic sensor system 18.

FIG. 2 describes a schematic flow diagram for explaining a method in accordance with a further embodiment of the present invention. The method in accordance with the further embodiment may be performed in particular while using or by means of the inductive charging device in accordance with the invention. The inductive charging device in accordance with the invention may likewise be configured and embodied so as to perform the method in accordance with the invention. Accordingly, the method may be adjusted in accordance with all developments and modifications that are described with regard to the charging device.

The method is started in a step S10. This may be by way of example parking or positioning an electric vehicle 1 in a charging position in an inductive charging device 10. The term 'charging position' is to be understood to be a position in which the inductive charging device 10 is able to inductively charge the electric vehicle 1. More specifically, the term 'charging position' may be understood to mean the optimal position which the electric vehicle 1 may assume in order for it to be charged by means of the inductive charging device 10. It is assumed that at the beginning of the method in step S10 offset parameters, in other words spacings in all three spatial dimensions, between the transmitter coil structure 12 of the charging device 10 no longer change.

The step S10 may also include detecting that an electric vehicle 1 is located in the charging position or receiving a charging request signal by means of which the inductive charging device 10 possibly in response to a user input, insertion of a coin or the like.

In a step S20, an active MOD method is performed, by way of example as described above with regard to the active electronic evaluation system and the sensor coil structure.

In a step S30, a check is performed by way of example by the control facility 20 as to whether a state is prevailing in which a metal object is not present, in other words whether the active MOD method has a positive or a negative result, i.e. whether the active MOD method has established that a metal object is actually located in the region of the transmitter coil structure 12, in particular between the transmitter coil structure 12 and the receiver coil structure 2 or not.

If the result of the active MOD method is positive, in other words, if a metal object has been detected (symbolized in FIG. 2 by means of an encircled plus sign), it is determined and controlled in step S40 by way of example by means of the control facility 20 that energy is not transmitted. It is possible to provide that in this case a warning signal is output to the electric vehicle 1 and/or to a user of the electric vehicle 1, by way of example to a mobile end device of the user. Thus, with the aid of the active MOD method it is not possible for a metal object to be present at the beginning of the energy transmission.

If the result of the active MOD method is negative, in other words if a metal object is not detected (symbolized in FIG. 2 by means of an encircled minus sign), it is determined and controlled in step S50, possibly by means of the control facility 20, that the inductive energy transmission procedure is started.

One or multiple output signals and/or results of the active electronic sensor 18 may be stored and/or evaluated in step S60 for example by means of the control facility 20, in order to generate reference values for a passive MOD method or to adjust previously predetermined or previously ascertained reference values for the passive MOD method. For this purpose, it is possible to store in the control facility 20 by way of example a model, or a characteristic field, by means of which, based on the characteristics of the output signal (or of the multiple output signals) of the active electronic sensor system 18, corresponding reference values for the passive MOD method or necessary adjustments to the existing reference values may be determined.

At the beginning of the energy transmission procedure, in a step S70, a switchover is performed from the active MOD method to the passive MOD method, in other words the performance of the active MOD method is terminated and the performance of the passive MOD method is commenced. The passive MOD method is preferably performed continuously or regularly while energy is being transmitted, so that it is possible to establish whether in the meantime a metal object has moved into the magnetic field range of the transmission magnetic field. The passive MOD method is preferably performed whilst using the reference values that are generated and/or adjusted in step S60, in other words calibrated whilst using the reference values.

A check is performed in step S80, by way of example by means of the control facility 20, as to whether the passive MOD method has a positive or negative result, in other words whether the passive MOD method has established that a metal object is actually located in the region of the transmitter coil structure 12, in particular between the transmitter coil structure 12 and the receiver coil structure 2, or not.

In the event that the result of the passive MOD method is positive, in other words if a metal object has been detected (symbolized in FIG. 2 by an encircled plus sign) it is determined and controlled in step S90, by way of example by the control facility 20, that the energy transmission procedure is interrupted. It may be provided that in this case, a warning signal is output to the electric vehicle 1 and/or to a user of the electric vehicle 1, by way of example to a mobile end device of the user. Thus, it is not possible that a metal object has moved into the magnetic field region of the transmission magnetic field while energy is being transmitted.

In the event that the result of the active MOD method is negative, in other words if a metal object has not been detected (symbolized in FIG. 2 by means of an encircled minus sign), it is determined and controlled in step S100, possibly by means of the control facility 20, that the inductive energy transmission procedure is continued until a termination condition is prevailing, by way of example until a termination signal is output, for example because a user of the inductive charging procedure would like to terminate the procedure or because funds are no longer available in order to pay for the inductive charging procedure or because the electric vehicle 1 or its energy storage device 4 has been fully charged. Naturally, the inductive charging procedure is also then interrupted as soon as it has been detected in step S80 that a metal object is present after all (step S90).

One or multiple output signals and/or results of the passive electronic evaluating system 16 may be stored and/or evaluated, for example by means of the control facility 20, in a step S110 in order to generate reference values for the active MOD method or to adjust previously predetermined or previously ascertained reference values for the active MOD method. For this purpose, it is possible to store in the control facility 20 by way of example a model, or a characteristic field, by means of which, based on the characteristics of the output signal (or of the multiple output signals) of the passive electronic evaluation sensor system 16, corresponding reference values for the active MOD method or necessary adjustments to the existing reference values, may be determined.

In a step S120, it is subsequently possible to switch back to the active MOD method, possibly by means of the control facility 20. In this case, the active MOD method may be performed preferably based on the reference values that are generated and/or adjusted in the step S110, in other words are calibrated based thereon.

The step S120, in other words the performance of the active MOD method, may run seamlessly into the step S20. Alternatively, the active MOD method may be terminated, for example after the expiry of the pre-defined time period, and the method subsequently awaits the return to the start with step S10. In this manner, an inductive charging device 10 may be monitored in each state (in other words in particular both during and also outside the inductive energy transmission procedure) for metal objects.

Although the present invention has been described above with reference to preferred exemplary embodiments, said invention is not limited thereto but rather may be modified in diverse ways. In particular, the invention may be changed or modified in various ways without departing from the core of the invention.

The invention claimed is:

1. An inductive charging device (10) for a vehicle (1), the charging device comprising:
    a transmitter coil structure (12) for inductive charging a battery of a vehicle (1) by means of generating an electromagnetic field to induce a charging current (12) in a receiver coil structure (2) of the vehicle (1);
    a current supply (13) for energizing the transmitter coil structure (12);
    a sensor coil structure having a number of sensor coils (22-i);
    an electronic controller (20) configured to set the inductive charging device (10) into a passive detection mode while an inductive charging procedure takes place and to set the inductive charging device (10) into an active detection mode if an inductive charging procedure is not actually being performed;
    a passive electronic evaluation system (16) configured to evaluate a current that is induced in the sensor coil structure and to use it for a passive metal object detection, MOD, in the area of the transmitter coil structure;
    an active electronic sensor system (18), which is configured to generate a magnetic sensor field for the active MOD procedure in the area of the transmitter coil structure (12) by means of at least in part energizing the sensor coil structure; and
    the electronic controller (20) configured to use a result of the MOD procedure in the active detection mode for calibrating or adjusting the passive electronic sensor system (16).

2. The charging device (10) as claimed in claim 1, wherein the active electronic sensor system (18) is configured to detect at least one electrical characteristic at least of one sensor coil of the sensor coil structure and to perform the MOD procedure whilst using the at least one detected electrical characteristic.

3. The charging device (10) as claimed in claim 2, wherein the active electronic sensor system (18) is configured to detect at least one electrical characteristic at least of one sensor coil of the sensor coil structure, said one sensor coil being energized to generate the magnetic sensor field, and to perform the MOD procedure whilst using the at least one detected electrical characteristic.

4. The charging device (10) as claimed in claim 2, wherein the active electronic sensor system (18) is configured to detect at least one electrical characteristic at least of one sensor coil of the sensor coil structure, said one sensor coil not being energized during the procedure of generating the magnetic sensor field, and to perform the MOD procedure whilst using the at least one detected electrical characteristic.

5. A method for monitoring an inductive charging device (10) for a vehicle (1), the method comprising:
    performing (S70) a passive metal object detection procedure (MOD) while a battery of a vehicle (1) is being inductively charged by means of generating an electromagnetic field to induce a charging current (12) in a receiver coil structure (2) of the vehicle (1);
    performing (S20; S120) an active MOD procedure at points in time at which inductive charging is not taking place and;
    adjusting or calibrating (S60) the passive MOD procedure whilst using the results of the active MOD procedure.

6. An inductive charging device (10) for a vehicle (1), the charging device comprising:
    a transmitter coil structure (12) for inductive charging a battery of a vehicle (1) by means of generating an electromagnetic field to induce a charging current (12) in a receiver coil structure (2) of the vehicle (1);
    a current supply (13) for energizing the transmitter coil structure (12);
    a sensor coil structure having a number of sensor coils (22-i);
    an electronic controller (20) configured to set the inductive charging device (10) into a passive detection mode while an inductive charging procedure takes place and to set the inductive charging device (10) into an active detection mode if an inductive charging procedure is not actually being performed;

a passive electronic evaluation system (16) configured to evaluate a current that is induced in the sensor coil structure and to use it for a passive metal object detection, MOD, in the area of the transmitter coil structure;

an active electronic sensor system (18), which is configured to generate a magnetic sensor field for the active MOD procedure in the area of the transmitter coil structure (12) by means of at least in part energizing the sensor coil structure; and the electronic controller (20) is configured to use a result of the MOD procedure in the passive detection mode for calibrating or adjusting the active electronic sensor system (18).

7. A method for monitoring an inductive charging device (10) for a vehicle (1), the method comprising:

performing (S70) a passive metal object detection procedure (MOD) while a battery of a vehicle (1) is being inductively charged by means of generating an electromagnetic field to induce a charging current (12) in a receiver coil structure (2) of the vehicle (1);

performing (S20; S120) an active MOD procedure at points in time at which inductive charging is not taking place; and adjusting or calibrating (S110) the active MOD procedure whilst using the results of the passive MOD procedure.

* * * * *